2,891,065
PRODUCTION OF SULFONIC ACID DERIVATIVES OF N-DISUBSTITUTED DITHIOCARBAMIC ACID ESTERS

Wolfgang Gündel, Dusseldorf-Oberkassel, Germany, assignor to Dehydag, Deutsche Hydrierwerke G.m.b.H., Dusseldorf, Germany, a corporation of Germany No Drawing. Application March 12, 1957
Serial No. 645,417

Claims priority, application Germany March 13, 1956

6 Claims. (Cl. 260—293.4)

This invention relates to the production of sulfonic acid derivatives of N-disubstituted dithiocarbamic acid esters from N-disubstituted dithiocarbamates and halogenated sulfonates.

Copending application Serial No. 500,677, filed April 11, 1955, describes a process for the production of N-disubstituted dithiocarbamic acid esters having sulfonic acid groups in the ester radical and of their salts, having the general structural formula

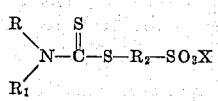

wherein R, $R_1$ and $R_2$ represent acyclic or cyclic radicals, preferably aliphatic radicals, which may also comprise substituents containing oxygen, sulfur or nitrogen atoms, and X represents hydrogen or any desired inorganic or organic salt-forming basic radical. In addition, R and $R_1$, together with the nitrogen atom, may be members of a heterocyclic radical, such as a piperidino or morpholino radical. In the appended claims the group

is represented by the symbol Z.

In accordance with said copending application, these sulfonic acid derivatives of N-disubstituted dithiocarbamic acid esters are produced by reacting salts of N-disubstituted dithiocarbamic acids with halogenated sulfonates, for instance in accordance with the following reaction equation:

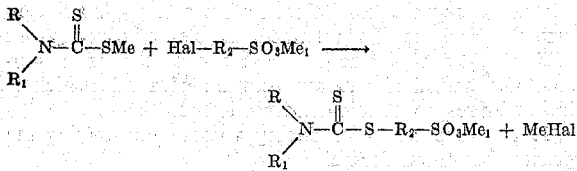

In this equation R, $R_1$ and $R_2$ have the meaning previously indicated, Me and $Me_1$ are alkali metal atoms and Hal represents a halogen atom. As disclosed in the copending application, the reaction is brought about by heating the reactants for extended periods of time in the presence of an inert solvent, such as a lower alcohol, which may be diluted with water, or merely in water as the inert solvent medium.

As a further improvement of the process described in said copending application, I have now discovered that the reaction of the N-disubstituted dithiocarbamates with the halogenated sulfonates proceeds particularly smoothly and efficiently if the reaction is carried out in an aqueous solution of inert inorganic or organic salts which do not actually participate in the desired reaction, but the concentration of which is such that the salts of the dithiocarbamic acid esters formed by the reaction substantially completely precipitate in crystalline form upon cooling of the reaction mixture. Thus, the concentration of the inert salt solution is dependent upon the solubility of the desired end product in the inert salt solution.

In accordance with the present invention, the reaction is advantageously carried out in highly concentrated, substantially saturated inert salt solutions, and in some cases it is sufficient to provide inert salt solutions containing somewhat less than the amount of salt required for saturation. In this manner, undesirable side reactions which are due to the instability of the N-disubstituted dithiocarbamates are suppressed to a substantial degree, so that much higher yields of the desired sulfonated N-disubstituted dithiocarbamates are obtained.

Examples of salts the aqueous, substantially saturated solutions of which may be employed as an inert reaction medium in accordance with the present invention are the following:

Sodium chloride
Sodium bromide
Sodium sulfate
Sodium nitrate
Sodium acetate the corresponding salts of potassium, calcium, magnesium, ammonium, ethylamine, diethylamine, triethylamine and of other inorganic and organic bases.

It is desirable, but not absolutely necessary, that the cationic moiety of the salt used to produce the inert, substantially saturated aqueous solution be the same as that in the two starting materials. For example, if the initial reactants are the sodium salt of an N-disubstituted dithiocarbamate and the sodium salt of a halogenated alkylsulfonic acid, it is advantageous to employ a sodium salt of the group mentioned above to produce the aqueous, substantially saturated solution which is used as the inert reaction medium in accordance with the present invention. The selection of the particular inert salt is, of course, predicated on whether the salt has the desired precipitating effect on the reaction product and will depend largely on its availability and relative cost. In most instances, sodium chloride is the most suitable salt for the present purpose because of its ready availability and low cost.

In selecting the proper concentration of the inert salt solution, it must be taken into consideration that one mol of halide is formed during the reaction (in the above reaction equation MeHal), which must also remain in solution. Consequently, the substantially concentrated inert salt solution must include a certain amount of excess water which will dissolve the halide, so that no other salt than the end product of the above-mentioned reaction precipitates. This additional amount of water required may readily be calculated and is advantageously added to the reaction mixture at the beginning of the reaction, because I have found that it is advantageous to work initially under conditions of less than complete saturation. In Example I below, which illustrates the use of a concentrated sodium chloride solution as the inert reaction medium, the required excess amount of water was introduced with the necessary alkali. In all cases, the most advantageous conditions of concentration may readily be ascertained by calculation and preliminary experiment.

In addition to the suppression of undesirable side reactions and increase in yields, the process in accordance with the present invention has the advantage that it produces reaction products of much higher purity than heretofore possible, so that these products may be used as such for the intended purpose without additional purification. The sulfur-containing, often malodorous side products which are formed to a minor extent at elevated temperatures from the N-disubstituted dithiocarbamates remain dissolved in the salt-containing mother liquor upon cooling of the reaction mixture. Consequently, after separating the crystalline precipitate by filtration upon termination of the reaction and washing the filter cake with fresh inert salt solution, the N-disubstituted dithiocarbamic acid ester-ω-sulfonates are virtually completely free from interfering side products and need not be purified in a separate process step. If relatively small amounts of the salt used for the preparation of the aqueous, substantially saturated solution serving as the reaction medium—as a rule, sodium chloride—are entrained in the end product, this slight contamination is of no particular importance for the majority of the uses to which the reaction products are put, for example as brighteners in the electroplating art.

The process according to the present invention may generally be applied to reactions between any of the reactants disclosed in said copending application and is not limited to the narrow temperature ranges recited in the examples. The yields are uniformly high and in the majority of the various reactants lie above 90% of theory.

The following examples will further illustrate the present invention without limiting the same thereto.

*Example I*

To a mixture of 1250 parts by volume of a saturated sodium chloride solution and 76 parts by weight carbon disulfide (1 mol), 73 parts by weight diethylamine (1 mol) were first added accompanied by vigorous stirring and cooling, and thereafter 125 parts by volume of a sodium hydroxide solution (1 mol) containing 40 parts by weight caustic soda were added to this reaction mixture. All of the carbon disulfide entered into the reaction and formed the sodium salt of N,N-diethyl-dithiocarbamic acid, which partially crystallized out of the cold solution upon prolonged standing. After adding 211 parts by weight bromoethane sodium sulfonate (1 mol), the mixture was heated for five hours at from 90–95° C. and the light-yellow mixture was then allowed to crystallize, after filtration if necessary. Upon cooling, an ample quantity of N-diethyl-dithiocarbamic acid-ethylester-ω-sodium sulfonate crystallized out and the crystalline product was filtered off. The product was then washed several times on a vacuum filter with a saturated sodium chloride solution; in the last washing step the filter vacuum was sharply increased. Upon drying the crystalline product, 230–250 parts by weight of the desired salt were obtained, which was recrystallized from alcohol to remove small amounts of entrained sodium chloride.

*Example II*

152 parts by weight carbon disulfide (2 mols) were added to 4000 parts by volume of a 12% calcium chloride solution, and thereafter 170 parts by weight piperidine (2 mols) were stirred into the solution over a period of about 15 minutes. 266 parts by weight of a 30% sodium hydroxide solution (2 mols) were added to this mixture in small portions, and the mixture was further stirred, toward the end at 50° C., until calcium oxide formed thereby and all of the carbon disulfide had gone completely into solution and the mixture had become clear. After adding 444 parts by weight 3-bromopropane calcium sulfonate (2 mols), the mixture was heated for three hours at 95° C. and was then allowed to crystallize, if necessary after filtering the hot solution. 528 parts by weight of well crystallized N,N-pentamethylene-1,5-dithiocarbamate acid propylester-ω-calcium sulfonate were obtained.

*Example III*

To an aqueous solution of 85.5 parts by weight of N,N-diethyl-dithiocarbamic acid, 165 parts by weight of crystallized sodium acetate and 105.5 parts by weight of 2-bromoethane sodium sulfonate were added. The mixture, which became clear on warming, was heated for five hours upon a boiling water bath. The N,N-diethyl-dithiocarbamic acid-ethylester-ω-sodium sulfonate crystallized out from the filtrated reaction mixture in an ample quantity and after cooling with ice was filtered off and dried. 95 parts by weight of this salt were obtained, which may be purified if necessary by recrystallization from alcohol to remove small amounts of entrained sodium acetate.

The same advantageous results were obtained when the saturated sodium chloride and calcium chloride solutions in the above examples were replaced by saturated aqueous solutions of one of the following salts; sodium bromide, sodium sulfate, sodium nitrate, sodium acetate, potassium chloride, potassium bromide, potassium sulfate, potassium nitrate, potassium acetate, calcium bromide, calcium sulfate, calcium nitrate, calcium acetate, magnesium chloride, magnesium bromide, magnesium sulfate, magnesium nitrate, magnesium acetate, ethylamine chloride, ethylamine bromide, ethylamine sulfate, ethylamine nitrate, ethylamine acetate and the corresponding salts of diethylamine and triethylamine.

While I have illustrated the present invention with the aid of certain specific embodiments thereof, it will be apparent to persons skilled in the art that the invention is not limited to those embodiments and that various changes and modifications may be made without departing from the spirit of the invention or the scope of the appended claims.

I claim:

1. In a process of producing a compound having the general structural formula

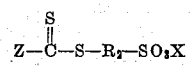

wherein Z represents an organic amino radical selected from the group consisting of lower alkylamino and piperidyl radicals, said amino radical being linked to the carbon atom through the nitrogen atom, $R_2$ is a lower alkylene radical and X is alkali metal, which comprises subjecting a compound having the general structural formula

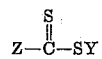

wherein Z represents a radical as above defined and Y is alkali metal to a condensation reaction at elevated temperatures in substantially equimolar proportion with a compound having the general structural formula

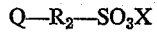

wherein Q represents a halogen atom and $R_2$ and X represent radicals as above defined, the step of carrying out said condensation reaction in the presence of a substantially saturated aqueous solution of a salt which is inert with respect to said condensation reaction.

2. In a process of producing a compound having the general structural formula

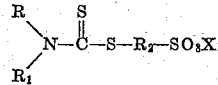

wherein R and $R_1$ are lower alkyl radicals, $R_2$ is lower alkylene, and X is alkali metal, which comprises subjecting a compound having the general structural formula

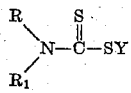

wherein R and $R_1$ represent radicals as defined above and Y is alkali and alkaline metal, to a condensation reaction at elevated temperatures in substantially equimolar proportion with a compound having the general structural formula

wherein Q is a halogen atom and $R_2$ and X are radicals as above defined, the step of carrying out said condensation reaction in the presence of a substantially saturated aqueous solution of a salt which is inert with respect to said condensation reaction.

3. In a process of producing a compound having the general structural formula

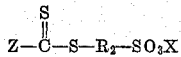

wherein Z is piperidyl linked to the carbon atom through the nitrogen atom, $R_2$ is lower alkylene, and X is alkali metal, which comprises subjecting a compound having the general structural formula

wherein Z represents a radical as above defined and Y is alkali metal to a condensation reaction at elevated temperatures in substantially equimolar proportion with a compound having the general structural formula

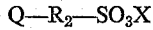

wherein Q represents a halogen atom and $R_2$ and X represent radicals as above defined, the step of carrying out said condensation reaction in the presence of a substantially saturated aqueous solution of a salt which is inert with respect to said condensation reaction.

4. In a process of producing a compound having the structural formula

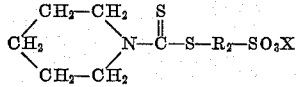

wherein $R_2$ is n-propyl and X is calcium, which comprises subjecting a compound having the structural formula

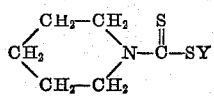

wherein Y is sodium, to a condensation reaction at a temperature of about 95° C. in substantially equimolar proportion with a compound having the structural formula

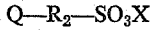

wherein Q is bromine and $R_2$ and X have the meaning indicated above, the step of carrying out said condensation reaction in the presence of a substantially saturated aqueous calcium chloride solution.

5. In a process of producing a compound having the structural formula

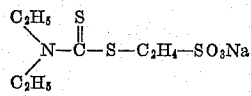

which comprises subjecting N,N-diethyl-sodium-dithiocarbamate to a condensation reaction with bromoethane-sodiumsulfonate at a temperature from 90° to about 95° C., the step of carrying out said condensation reaction in the presence of a substantially saturated aqueous sodium chloride solution.

6. In a process of producing a compound having the structural formula

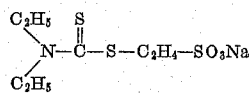

which comprises subjecting N,N-diethyl-sodium-dithiocarbamate to a condensation reaction with bromoethane-sodium-sulfonate at a temperature of about 100° C., the step of carrying out said condensation reaction in the presence of a substantially saturated aqueous sodium acetate solution.

References Cited in the file of this patent
UNITED STATES PATENTS

| | | |
|---|---|---|
| 2,067,494 | Lichty | Jan. 12, 1937 |
| 2,127,375 | Bousquet | Aug. 16, 1938 |